Aug. 11, 1959  L. J. HARRIS ET AL  2,898,935
WATER HAMMER RELIEF DEVICE

Filed July 23, 1958  4 Sheets-Sheet 1

INVENTORS
LEWIS J. HARRIS
BY JOSEPH J. CARROLL
ATTORNEY

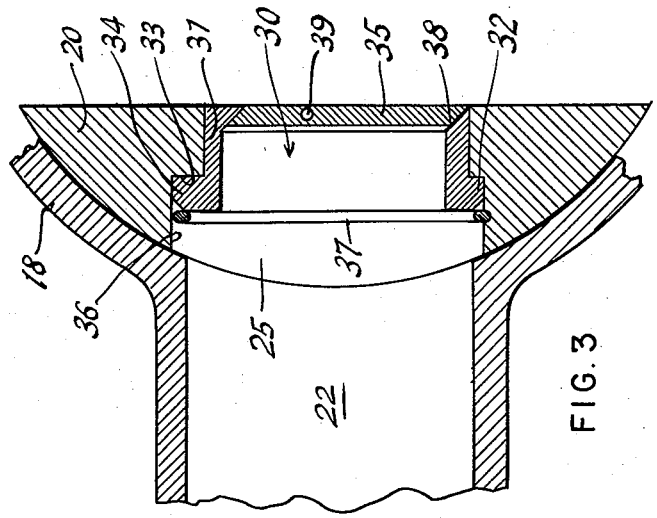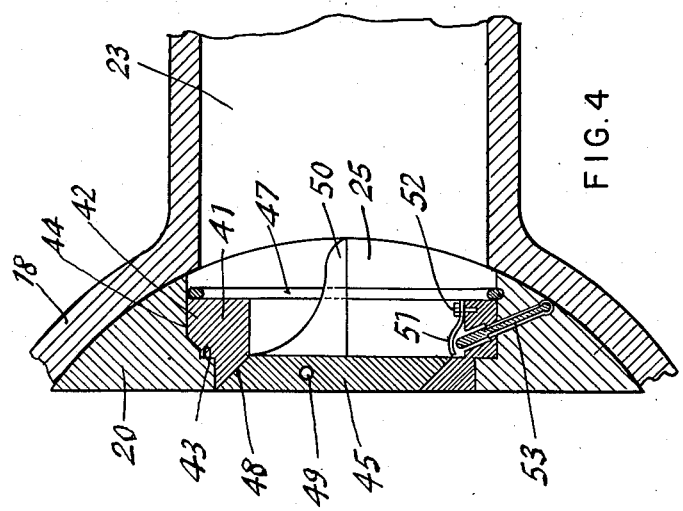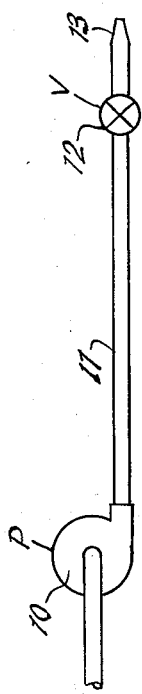

INVENTORS
LEWIS J. HARRIS
JOSEPH J. CARROLL
BY
ATTORNEY

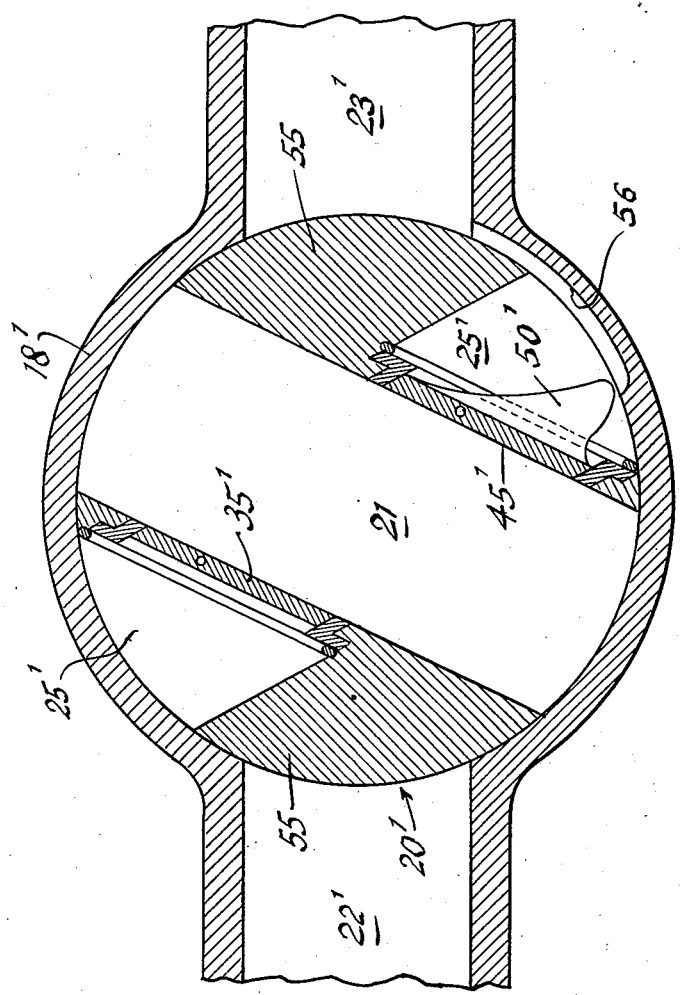

2,898,935
WATER HAMMER RELIEF DEVICE

Lewis J. Harris, Brooklyn, and Joseph J Carroll, Bronx, N.Y.

Application July 23, 1958, Serial No. 750,511

14 Claims. (Cl. 137—599.2)

This invention relates to fluid pressure control devices and, more particularly, to a novel relief device for automatically reducing the pressure effects resulting from water hammer when a fluid discharge valve is closed too quickly relative to its distance from a source of supply under pressure.

The term "water hammer" is used to designate the increased pressure, over and above the normal flow pressure, developed in a fluid flow line extending from a source of fluid under pressure to a discharge valve, such as a nozzle, when the discharge is closed too quickly relative to the length of the flow line. The kinetic energy of the column of fluid in the line between the source and the discharge valve is a function of the flow velocity or rate. When the discharge valve is closed, provision must be made for relatively gradual dissipation of this kinetic energy, as a relatively abrupt interruption of the flow will result in destructive dissipation of the kinetic energy.

The kinetic energy of the flowing fluid may be safely dissipated by a gradual closing of the discharge valve, taking into consideration the length of the line and the flow velocity, which latter is a function of the quantity flowing and the cross-sectional area of the line. The proper valve closing rate is a relative term, as a slow closing rate for a relatively short line is much too fast for a longer line.

The relatively abrupt closing of the discharge valve results in a shock wave travelling back to the source and then returning to the valve. If the valve is fully closed before the return of the shock wave, maximum water hammer, with the development of maximum excessive pressures in the line will result. The time required for the shock wave to make a round trip is known as the "critical time," and the valve closing time must be in excess of such critical time if maximum water hammer is to be avoided.

The problem of water hammer is of particular importance in the case of fire hose lines extending from a pumper to a manually controlled discharge nozzle and when using fog nozzles requiring pressure substantially higher than heretofore used nozzle pressures. Too abrupt closure of the discharge nozzle of a charged line fed under pressure from a pumper produces water hammer in the line resulting in burst hose and thus a hose line useless in fighting a fire. The problem is especially prevalent in long lines of hose, or when pumper relays are used to supply water over a long distance. With the aforementioned fog nozzles, the pressures all along the line are much closer to the test pressure of the hose.

While nozzlemen are trained to close nozzles slowly, when shutting off a line, the term "slowly" is a relative one as many factors, such as the length of line back to the pumper, supply pressure, etc. must be considered in determining the maximum permissible nozzle shut-down rate. The same rate of nozzle closure which is "slow" on a short line may be excessively fast on a long line.

Many arrangements are used to prevent destructive high pressures in hose lines, such as pressure regulators, pressure relief devices, by-passes, governors, and other regulating devices. However, as all of these are used at the pumper, or source of supply, they are ineffective in preventing damage due to water hammer in hose lines leading from the pumper to a shut-off nozzle as they are at the wrong point in the system to cope effectively with water hammer, which originates at the shut-off point and thus will have done its damage before its effect is operative at a relief or regulating device at the supply point. Even if such relief or regulating devices were at the right point in the system, the time delay or time lag in their operation would reduce their effectiveness in mitigating the effect of water hammer.

The foregoing is not to say that these devices are ineffective for their design purpose, which is primarily that of protecting the hose or other charged line from over pressure due to a rise in supply pressure at the source.

A consideration of the foregoing factors leads to the conclusion that any solution of the water hammer problem is dependent upon the following conditions applied either separately or in combination:

(1) Control of the speed of closure of the discharge device or nozzle to assure a closure time less than the critical time.

(2) Providing for automatic re-starting of the water discharge before the oscillating water column can develop maximum water hammer, as the stoppage of discharge with the resultant change in velocity of the water is the cause of development of water hammer. The higher the flow velocity, the greater is the maximum water hammer developed.

The first of these conditions is difficult to apply generally in fire hose, as the critical speed is dependent upon such a variable factor as the length of the discharge line. Accordingly, a practical and universally applicable solution can be more readily effected by apparatus meeting the second condition, either alone or also combining a time delay to meet, at least partially, the first condition.

In accordance with the present invention, a discharge valve or nozzle is provided with the usual main discharge waterway alignable with the waterway of the charged hose or other charged line, and having a flow area substantially equal to that required to effectively operate the nozzle for efficient discharge through the nozzle. In addition, however, the movable core or internal body of the valve or nozzle is provided with an auxiliary waterway brought into substantial registry with the charged line upon closing movement of the valve or nozzle.

This auxiliary waterway has an effective flow area which approximates, as near as possible, the flow area of the main discharge waterway, and is provided with valves at its entrance or upstream end and at its discharge or downstream end. When the auxiliary waterway is aligned with the charged line, the upstream valve opens to allow water to enter the auxiliary waterway and act against the downstream valve. The latter is latched closed by pressure responsive latch means so that it opens only when the water pressure exceeds a pre-set value.

Thus, if the valve closing time is less than the critical time, the pressure developed due to water hammer will open the downstream valve to re-start the water discharge and the re-started discharge will limit magnitude of the hammer and limit the duration of time the hammer will act on any portion of the hose line. This in turn will minimize the effect of the water hammer. The operator, noting this discharge, will realize that the valve has been closed too quickly, and the re-started discharge will dissipate the energy of the water column to prevent water hammer.

The operator can then re-open the valve or nozzle for full discharge, which re-opening automatically re-sets the downstream valve means. The nozzle may then be shut off or closed at a slower rate so that water hammer will not develop, with the result that the downstream valve means remains closed. This preferred arrangement is particularly useful when used in conjunction with a fog nozzle having its own water shut-off means.

In an alternative form of the invention, the cylinder or plug of the valve or nozzle has three positions. In one position, the main waterway is aligned for full discharge. In the second position, the auxiliary waterway is aligned for water dissipation. In the third position, the flow is blocked by a solid part of the plug or cylinder.

For an understanding of the invention principles, reference is made to the following description of typical embodiments thereof as illustrated in the accompanying drawings. In the drawings:

Figures 3 and 4 are enlarged, partial diametric sectional views illustrating, respectively, the upstream and downstream auxiliary waterway valve assemblies;

Figures 5, 6 and 7 are diametric sectional views of a nozzle cylinder embodying an alternate form of invention illustrating, respectively, the fully open, water hammer relief, and fully closed positions; and Figure 8 is a diagrammatic view of a system to which the invention is applicable.

Figure 1:
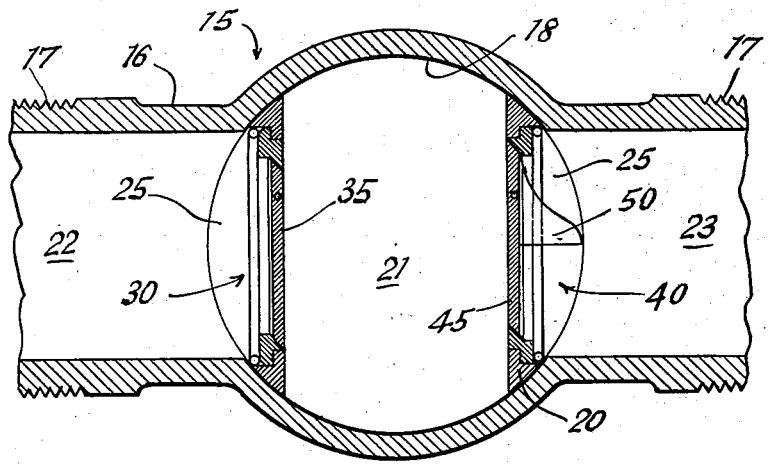
Figures 1 and 2 are diametric sectional views through the cylinder or plug of a preferred form nozzle embodying the invention, and respectively illustrating the closed and full discharge positions of the nozzle.

In the drawings, the invention is illustrated, by way of example only, as incorporated in a standard form of fire hose discharge nozzle, with certain parts of the nozzle omitted, or shown only schematically, to simplify and clarify the disclosure.

Referring first to Figure 8, the invention is applicable to a flow system including a pump or another source of pressure 10 supplying fluid under pressure to charge a line 11 which may be a relatively long line such as a fire hose charged from a pumper. Discharge from line 11 is controlled by a valve 12 associated with a discharge nozzle 13. Valve 12 and nozzle 13 may be combined in the hose nozzle 15 shown in Figures 1–4.

Referring to Figures 1–4, fire nozzle 15 comprises a body 16 having suitable coupling means, such as threads 17, at each end. While male coupling means are shown, one end of body 16 may have external threads and the other end internal threads, or both coupling means may be female, without affecting the principles or operation of the invention. Between its ends, body 16 is formed with a cylindrical valve casing portion 18 fluid tightly receiving a rotatable valve cylinder or plug 20 incorporating the invention water hammer relief means. It will be understood by those skilled in the art that nozzles, such as 15, are usually reduced in diameter from the adit to the exit end. However, for illustrative purposes, this reduction has been omitted from the drawings.

Cylinder 20 is provided with a diametrically extending main waterway 21 having a flow area substantially equal to that of the adit and exit passages 22, 23 of body 16 so as to offer substantially no added restriction to flow of water through nozzle 15. To open the nozzle, main waterway 21 is moved into axial alignment with passages 22, 23 by a suitable operating handle (not shown) attached to cylinder 20.

In accordance with the invention, cylinder 20 is provided with an auxiliary waterway extending diametrically thereof and preferably normal to main waterway 21. This auxiliary waterway, whose entrance and exit ends are indicated at 25, 25, includes, in part main waterway 21, but the effective flow area of its ends 25 is substantially as large as that of main waterway 21. Auxiliary waterway 25 is aligned with passages 22, 23 when the nozzle is closed.

The upstream end of auxiliary waterway 25 is normally closed by a valve assembly 30, and the downstream end is normally closed by a pressure responsive valve assembly 40.

Referring to Figure 3, valve assembly 30, comprises an annular body 31 having a shoulder 32 fitting in a recess 33 in cylinder 20. A spline 34 on body 31 engages in a groove 36 in cylinder 20 to properly position body 31 in alignment with waterway 25, assembly 30 being held in position by a snap ring 37. Body 31 is formed at its inner end with a bevelled valve seat 38 engageable by a butterfly valve 35 on a shaft 39 seated at its ends in body 31. It will be noted that valve 35 is mounted on shaft 39 so that much more than one-half its area is on one side of shaft 39. It will further be noted that the flow area of body 31 is as near as possible equal to that of passage 22.

Valve assembly 40 is illustrated in Figure 4 as including an annular valve body 41 seated having a shoulder 42 seated in recess 43 in cylinder 20. Spline 44 properly positions body 41 by engagement in a groove 46 in cylinder 20, the assembly being held in position by a snap ring 47. Body 41 has a bevel edge annular valve seat 48 engaged by a butterfly valve 45 mounted on a shaft 49 having its ends engaged in body 41, valve 45 having more than one-half its area to one side of shaft 49. For a purpose to be described, the outer surface of valve 45 carries an abutment or fin 50, which, in the closed position of valve 45, has its free end just at the periphery of cylinder 20.

Valve 45 is normally latched closed by bowed spring 51 whose tension is adjustable by a cap screw 52. A re-set or lock pin 53 is mounted in aligned apertures in cylinder 20 and body 41, with its inner end operable against spring 51.

Figure 2:
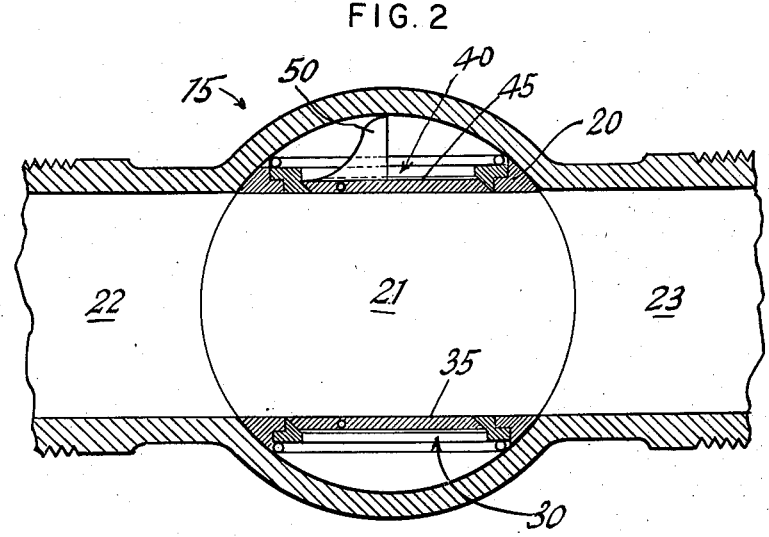

The device operates as follows. In the position of Figure 2, waterway 21 is aligned with passages 22, 23 and the nozzle is fully open. To close the nozzle, the operator rotates valve plug 20 clockwise toward the position of Figures 1, 3 and 4. During the time taken to move plug 20 from the fully open position to a position in which the outer end of pin 53 is still in passage 23 and just in advance of the leading edge (Figure 4) of the inner surface of casing portion 18, the water pressure opens valve 35 and acts against valve 45. If such closing time is less than the critical time, the water pressure will open valve 45 resulting in discharge from passage 23.

Noting this, the operator rotates plug 20 counter-clockwise toward the open position so that fin 50, engaging the inner surface of casing portion 18, re-closes valve 45. The operator then more slowly rotates plug 20 toward the position of Figures 1, 3 and 4. If no discharge from passage 23 is observed, he continues such movement to the fully closed position (Figures 1, 3 and 4) in which pin 53, riding onto the inner surface of casing portion 18, moves inwardly to positively lock valve 45 closed. If the pressure conditions are such as to exceed the valve setting, then flow may be shut off by the alternate closing means in the fog nozzle.

Figure 5:
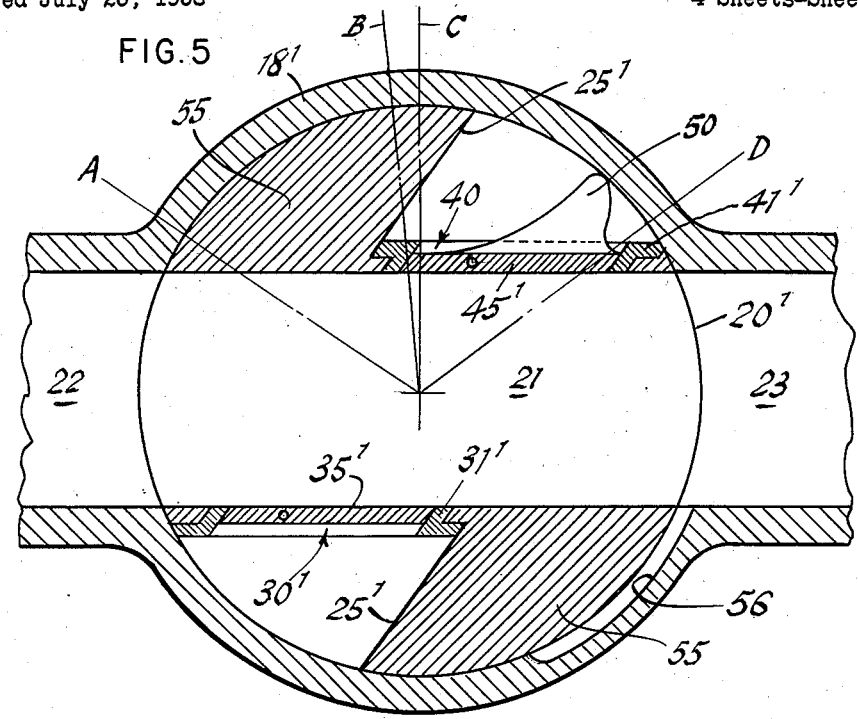
Figure 6:
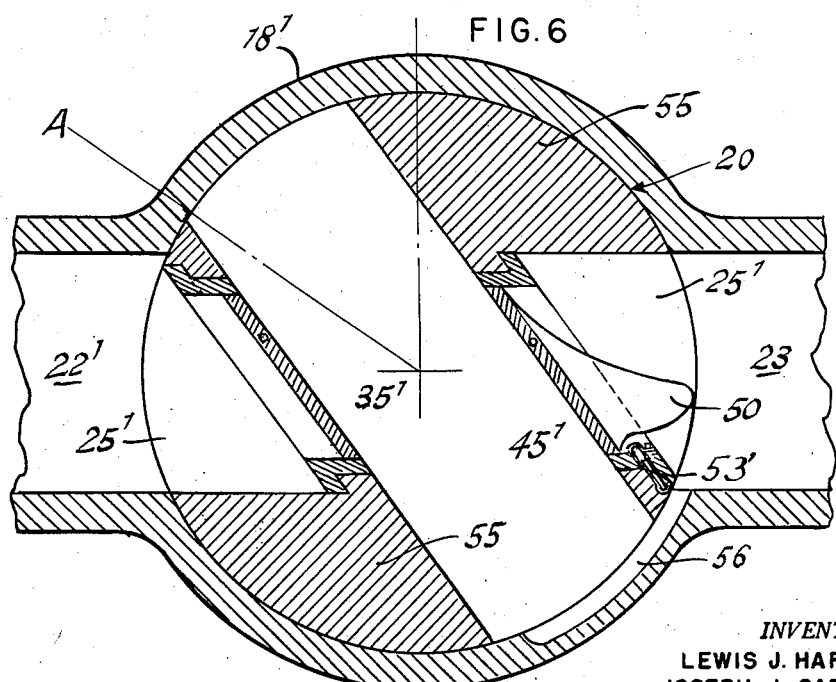

The embodiment shown in Figures 5, 6 and 7 differs from that of Figures 1–4 only in that flow through the nozzle is blocked by a solid portion of plug 20 in the fully closed position. In Figures 5, 6 and 7, the same reference characters, primed, have been used to indicate identical or corresponding parts.

In Figures 5, 6 and 7, the axes of main waterway 21' and auxiliary waterway 25' are at an angle of substantially 60° to each other, providing diametrically opposite solid portions 55, 55 of plug 20' having outer cylindrical surfaces extending circumferentially through arcs substantially greater than those cut by waterway 21'. In the full flow position of Figure 5, the operating handle is in the position indicated by line A, and waterway 21' is aligned with passages 22', 23'.

To close the nozzle, the operator moves the handle to position B in which auxiliary waterway 25' has not quite reached the position of Figure 6, the outer end of pin 53' being just short of the inner surface of casing portion 18'. Should discharge from passage 23' be observed, the operator may either return the handle to position A, to fully open the nozzle or may move it through position B to close the nozzle in position D. If the handle is returned to position A, valve 45' is re-closed by fin 50'.

If the valve is moved from either A or B to position C, pin 53' is moved inwardly to its locking position. It is preferable that valve 45' be re-closed, by handle movement to position A, before handle movement to position C. At position C, a detent (not shown) acts to releasably restrain movement of the handle to position D, shown in Figure 7, where flow is solidly blocked by plug portions 55, so that positive and conscious action by the operator is needed to move the handle to the position of Figure 7. Should the handle be moved to position D with valve 45' not closed, fin 50' can ride in an arcuate groove 56 in the inner surface of casing portion 18'.

While specific embodiments of the invention have been shown and described in detail to illustrate the application of the invention principles, it will be understood that the invention may be embodied otherwise without departing from such principles.

What is claimed is:

1. A water hammer relief device, for connection to the discharge end of a relatively elongated charged line connected to a source of fluid under pressure and subject to water hammer when the flow therethrough is completely interrupted in less than a predetermined critical time; said device comprising, in combination, means forming a valve casing and inlet and outlet passages in communication with said casing; a valve member mounted in said casing and formed with a main waterway extending therethrough, and an auxiliary waterway extending therethrough; and pressure responsive valve means controlling flow through said auxiliary waterway; said member being movable between an open position, in which said main waterway interconnects said passages for substantially unrestricted flow through said device, and a closed position in which the flow through said device is interrupted; said auxiliary waterway, during movement of said member in a closing direction, interconnecting said passages after such movement has interrupted flow through said main waterway; whereby if the flow through said main waterway has been interrupted in less than the critical time, with resultant development of water hammer, the over pressure due to the water hammer will open said pressure responsive valve means for resumption of flow between said passages through said auxiliary waterway.

2. A water hammer relief device, for connection to the discharge end of a relatively elongated charged line connected to a source of fluid under pressure and subject to water hammer when the flow therethrough is completely interrupted in less than a predetermined critical time; said device comprising, in combination, means forming a valve casing and inlet and outlet passages in communication with said casing; a valve member mounted in said casing and formed with a main waterway extending therethrough having a flow area substantially equal to that of said passages, and an auxiliary waterway extending therethrough having an effective flow area less than that of said passages; and pressure responsive valve means controlling flow through said auxiliary waterway; said member being movable between an open position, in which said main waterway interconnects said passages for substantially unrestricted flow through said device, and a closed position in which the flow through said device is interrupted; said auxiliary waterway, during movement of said member in a closing direction, interconnecting said passages after such movement has interrupted flow through said main waterway; whereby, if the flow through said main waterway has been interrupted in less than the critical time, with resultant development of water hammer, the over pressure due to the water hammer will open said pressure responsive valve means for resumption of restricted flow between said passages through said auxiliary waterway.

3. A water hammer relief device, for connection to the discharge end of a relatively elongated charged line connected to a source of fluid under pressure and subject to water hammer when the flow therethrough is completely interrupted in less than a predetermined critical time; said device comprising, in combination, means forming a valve casing and inlet and outlet passages in communication with said casing; a valve member mounted in said casing and formed with a main waterway extending therethrough, and an auxiliary waterway extending therethrough; pressure responsive valve means controlling flow through said auxiliary waterway; said member being movable between an open position, in which said main waterway interconnects said passages for substantially unrestricted flow through said device, and a closed position in which the flow through said device is interrupted; said auxiliary waterway, during movement of said member in a closing direction, interconnecting said passages after such movement has interrupted flow through said main waterway; whereby, if the flow through said main waterway has been interrupted in less than the critical time, with resultant development of water hammer, the over pressure responsive valve means for resumption of flow between said passages through said auxiliary waterway; and means operable, upon movement of said member to the fully closed position, to lock said valve means in the closed position.

4. A water hammer relief device, for connection to the discharge end of a relatively elongated charged line connected to a source of fluid under pressure and subject to water hammer when the flow therethrough is completely interrupted in less than a predetermined critical time; said device comprising, in combination, means forming a valve casing and inlet and outlet passages in communication with said casing; a valve member mounted in said casing and formed with a main waterway extending therethrough having a flow area substantially equal to that of said passages, and an auxiliary waterway extending therethrough having an effective flow area less than that of said passages; pressure responsive valve means controlling flow through said auxiliary waterway; said member being movable between an open position, in which said main waterway interconnects said passage for substantlaly unrestricted flow through said device, and a closed position in which the flow through said device is interrupted; said auxiliary waterway, during movement of said member in a closing direction, interconnecting said passages after such movement has interrupted flow through said main waterway; whereby, if the flow through said main waterway has been interrupted in less than the crticial time, with resultant development of water hammer, the over pressure due to the water hammer will open said pressure responsive valve means for resumption of restricted flow between said passages through said auxiliary waterway; and means operable, upon movement of said member to the fully closed postion, to lock said valve means in the closed position.

5. A device as claimed in claim 4 in which said valve means comprises a valve; and pressure releasable latch means normally latching said valve in the closed position and operable, responsive to over-pressure due to water hammer, to release said valve to open.

6. A device as claimed in claim 5 including means operable, responsive to movement of said device in an opening direction, to re-latch said valve.

7. A device as claimed in claim 4 in which said valve means is mounted in the downstream portion of said auxiliary waterway; and a second pressure responsive valve means mounted in the upstream portion of said auxiliary waterway.

8. A device as claimed in claim 7 in which said first-named valve means comprises a valve; and pressure releasable latching said valve in the closed position and operable, responsive to over-pressure due to water hammer, to release said valve to open.

9. A device as claimed in claim 8 including means operable, responsive to movement of said device in an opening direction, to relatch said valve.

10. A device as claimed in claim 7 in which each valve means comprises a valve body removably mounted in said auxiliary waterway, and a butterfly valve swingably mounted in the valve body with the major area of each butterfly valve to one side of its pivot.

11. A device as claimed in claim 6 in which said relatching means comprises a projection said valve engageable with said casing when the valve is open.

12. A device as claimed in claim 4 in which said casing is cylindrical, said device is a cylindrical plug rotatable between said positions, and said waterways extend diametrically of said plug.

13. A device as claimed in claim 12 in which said waterways are perpendicular to each other.

14. A device as claimed in claim 12 in which said waterways intersect at an angle of substantially 60° between their axes to leave a solid part of the plug having diametrically opposite surface areas greater than the flow area of said passages; and said plug has an open position in which said main waterway is axially aligned with said passages, an intermediate position in which said auxiliary waterway is substantially axially aligned with said passages, and a closed position in which the solid parts of the plug closes off both passages.

No references cited.